US010299447B2

(12) United States Patent
Bermudez Rodriguez et al.

(10) Patent No.: US 10,299,447 B2
(45) Date of Patent: May 28, 2019

(54) TARGETED IRRIGATION USING A CENTRAL PIVOT IRRIGATION SYSTEM WITH A SENSOR NETWORK

(71) Applicant: International Business Machines Corporation, Armonk, NY (US)

(72) Inventors: Sergio A. Bermudez Rodriguez, Boston, MA (US); Hendrik F. Hamann, Yorktown Heights, NY (US); Levente Klein, Tuckahoe, NY (US); Fernando J. Marianno, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/915,116

(22) Filed: Mar. 8, 2018

(65) Prior Publication Data

US 2018/0192599 A1 Jul. 12, 2018

Related U.S. Application Data

(63) Continuation of application No. 14/499,458, filed on Sep. 29, 2014, now Pat. No. 9,943,046.

(51) Int. Cl.
*A01G 25/16* (2006.01)
*A01G 25/09* (2006.01)

(52) U.S. Cl.
CPC ........... *A01G 25/16* (2013.01); *A01G 25/092* (2013.01); *A01G 25/167* (2013.01); *G05B 2219/2625* (2013.01)

(58) Field of Classification Search
CPC ........ A01G 25/00; A01G 25/02; A01G 25/16; A01G 25/092; A01G 25/095;
(Continued)

(56) References Cited

U.S. PATENT DOCUMENTS 4,015,366 A 4/1977 Hall, III
5,386,287 A 1/1995 Berssen et al.
(Continued)

OTHER PUBLICATIONS

Dong et al., "Autonomous Precision Agriculture Through Integration of Wireless Underground Sensor Networks with Center Pivot Irrigation Systems", Ad Hoc Networks, vol. 11, No. 7, Sep. 2013, pp. 1975-1987.
(Continued)

*Primary Examiner* — Jason D Mitchell
(74) *Attorney, Agent, or Firm* — Michael A. Petrocelli

(57) ABSTRACT

A system includes a plurality of optical sensors located along at least one pipe segment of a rotating arm that pivots around an irrigation area of a field, the plurality of optical sensors continuously monitors soil and vegetation conditions and transmits sensed data to a central computer, and a plurality of in-ground sensors scattered in the irrigation area of the field, the plurality of in-ground sensors continuously monitors soil conditions and transmits sensed data to a plurality of gateway devices located in the rotating arm, the plurality of gateway devices transmits data from the plurality of in-ground sensors to the central computer where data from the plurality of optical sensors and the plurality of in-ground sensors is integrated with external data to determine water and fertilizer needs based on which an irrigation schedule is created.

20 Claims, 7 Drawing Sheets

(58) Field of Classification Search
CPC .. A01G 25/097; A01G 25/162; A01G 25/165; A01G 25/167
USPC ........................................................ 700/284
See application file for complete search history.

(56) References Cited

U.S. PATENT DOCUMENTS

| | | | |
|---|---|---|---|
| 7,584,053 | B2 | 9/2009 | Abts |
| 7,742,862 | B2 | 6/2010 | Anderson et al. |
| 8,185,303 | B1 | 5/2012 | Wieting |
| 2004/0083833 | A1 | 5/2004 | Hitt et al. |
| 2006/0140450 | A1 | 6/2006 | Hong et al. |
| 2007/0042803 | A1 | 2/2007 | Anderson |
| 2009/0216345 | A1 | 8/2009 | Chrisffort |
| 2010/0038440 | A1 | 2/2010 | Ersavas |
| 2011/0209765 | A1 | 9/2011 | Mozayeny |
| 2012/0029709 | A1 | 2/2012 | Safreno |
| 2012/0130552 | A1 | 5/2012 | Schmidt et al. |
| 2012/0267447 | A1 | 10/2012 | Abts |
| 2012/0284264 | A1 | 11/2012 | Lankford et al. |
| 2012/0290140 | A1 | 11/2012 | Groeneveld |
| 2013/0104455 | A1 | 5/2013 | Groeneveld |
| 2013/0153673 | A1 | 6/2013 | Younis et al. |
| 2014/0172133 | A1 | 6/2014 | Snyder |
| 2015/0272017 | A1 | 10/2015 | Hedley et al. |
| 2015/0309496 | A1 | 10/2015 | Kah, III et al. |
| 2016/0019560 | A1 | 1/2016 | Benkert et al. |
| 2016/0088807 | A1 | 3/2016 | Bermudez Rodriguez et al. |
| 2016/0187258 | A1 | 6/2016 | Mlekicki et al. |
| 2016/0255763 | A1 | 9/2016 | Canyon |

OTHER PUBLICATIONS

Tooker et al., "Connecting Soil to the Cloud: A Wireless Underground Sensor Network Testbed", 2012 9th IEEE Communications Society Conference on Sensor, Mesh and Ad Hock Communications and Networks (SECON), pp. 79-81.

Vellidis et al., "A real-time wireless smart sensor array for scheduling irrigation", Computer and Electronics in Agriculture, 6 I, (2008), pp. 44-50.

Kranz et al., "A Review of Mechanical Move Sprinkler Irrigation Control and Automation Technologies", Applied Engineering in Agriculture, vol. 28, No. 3, pp. 389-397, 2012 American Society of Agricultural and Biological Engineers.

Barnes et al, "Coincident Detection of Crop Water Stress, Nitrogen Status and Canopy Density Using Ground-Based Multispectral Data", Proceedings of the Fifth International Conference on Precision Agriculture, Jan. 2000, 16 pages.

IBM: List of IBM Patents or Patent Applications Treated As Related (Appendix P), Mar. 8, 2018, 2 pages.

TARGETED IRRIGATION USING A CENTRAL PIVOT IRRIGATION SYSTEM WITH A SENSOR NETWORK

BACKGROUND

The present invention generally relates to central pivot irrigation systems and more particularly to implementing targeted irrigation using the central pivot irrigation system with a wireless sensor network. The series of practices implemented to accurately and effectively allocate water to growing crops may be generally referred to as precision agriculture. Precision agriculture may help reduce operating costs while simultaneously improving crop yield. Precision agriculture may include irrigation systems such as a central pivot irrigation system, which may be commonly used in current farming practices to allocate water and/or fertilizers to areas of land on which a crop may be growing. Central pivot irrigation systems are most commonly used in large farms with scattered field sites and multiple crops, especially because of their ease of operation and efficiency.

Central pivot irrigation systems may generally include a central tower, or pivot point, located at the center of the irrigating area and a rotating arm pivoting around the central tower at an elevated position above the ground. The rotating arm may include a pipe or conduit extending laterally across the rotating arm away from the central tower. Water and/or fertilizers may be sprayed from the pipe at predetermined points along the conduit in which sprinklers or nozzles have been located. The rotating arm may further include trusses or towers supported by wheels to maintain the pipe in the elevated position above the ground. As the rotating arm pivots around the central tower, water and/or fertilizers may be fed and sprinkled in a circular pattern.

Variability in field characteristics such as, for example, vegetation cover, soil moisture and canopy leaf temperature may affect the effectiveness of the central pivot irrigation system in determining when irrigation may be needed since equal amounts of water may be generally dispensed to the entire field. Also, determining the exact geospatial location where precision agriculture, including variable irrigation rate management, may need to be applied may pose a challenge to current farming practices due to the lack of a continuous monitoring system.

SUMMARY

According to an embodiment of the present disclosure, a system may include: a plurality of optical sensors located along at least one pipe segment of a rotating arm that pivots around an irrigation area of a field, the plurality of optical sensors may continuously monitor soil and vegetation conditions and may transmit sensed data to a central computer, and a plurality of in-ground sensors scattered in the irrigation area of the field, the plurality of in-ground sensors may continuously monitor soil conditions and may transmit sensed data to a plurality of gateway devices located in the rotating arm, the plurality of gateway devices may transmit data from the plurality of in-ground sensors to the central computer where data from the plurality of optical sensors and the plurality of in-ground sensors may be integrated with external data to determine water and fertilizer needs based on which an irrigation schedule is created.

According to another embodiment of the present disclosure, a system may include: a plurality of pipe segments joined together end-to-end and supported above the ground on wheeled framed towers, the plurality of pipe segments may be rotatably attached at one end to a central tower such that they rotate freely about the central tower, each pipe segment may include one or more nozzles for dispensing a fluid on an irrigation area below the pipe segments, a plurality of optical sensors located along one or more of the pipe segments, the optical sensors may estimate soil and vegetation properties and may generate optical sensor data, a plurality of in-ground sensors at least partially embedded into the soil within the irrigation area, the in-ground sensors may detect soil properties and may generate in-ground sensor data, a gateway device attached to one or more of the wheeled framed towers, the plurality of in-ground sensors may wirelessly transmit the soil properties to the gateway device, and a central computer located in the central tower, the gateway device may wirelessly transmits the in-ground sensor data to the central computer to determine the irrigation needs of the irrigation area in the form of an irrigation map by processing the in-ground sensor data, the optical sensor data, and external data, the central computer may communicate with individual flow control valves corresponding with each nozzle to open or close to irrigate one or more zones identified by the irrigation map.

According to another embodiment of the present disclosure, a method may include: providing a central pivot irrigation system including a plurality of pipe segments joined together end-to-end and supported above the ground on wheeled framed towers, the plurality of pipe segments may be rotatably attached at one end to a central tower such that they rotate freely about the central tower, each pipe segment including one or more nozzles for dispensing a fluid on an irrigation area below the pipe segments, acquiring in-field data from a wireless sensor network including: a plurality of optical sensors located along one or more of the pipe segments, the optical sensors estimating soil and vegetation properties and generating optical sensor data, a plurality of in-ground sensors at least partially embedded into the soil within the irrigation area, the in-ground sensors detecting soil properties and generating in-ground sensor data, and a gateway device attached to one or more of the wheeled framed towers, the plurality of in-ground sensors wirelessly transmitting the soil properties to the gateway device and the gateway device wirelessly transmitting the in-ground sensor data to a central computer located in the central tower, and determining in the central computer irrigation needs of the irrigation area in the form of an irrigation map by processing the in-ground sensor data, the optical sensor data, and external data, the central computer may communicate with individual flow control valves corresponding with each nozzle to open or close to irrigate one or more zones identified by the irrigation map.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
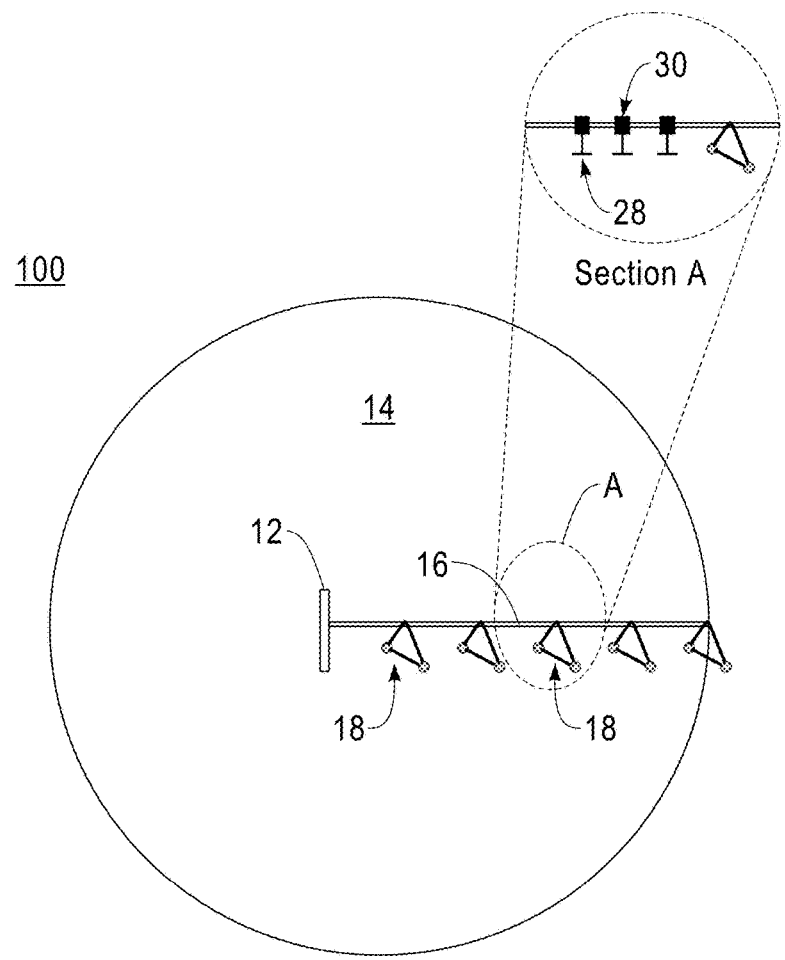
FIG. 1 is a schematic view of a central pivot irrigation system depicting an irrigation area of a field, according to an embodiment of the present disclosure.

Detailed embodiments of the claimed structures and methods are disclosed herein; however, it may be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

In the following description, numerous specific details are set forth, such as particular structures, components, materials, dimensions, processing steps, and techniques, in order to provide a thorough understanding of the present invention. However, it will be appreciated by one of ordinary skill of the art that the invention may be practiced without these specific details. In other instances, well-known structures or processing steps have not been described in detail in order to avoid obscuring the invention. It will be understood that when an element as a layer, region, or substrate is referred to as being "on" or "over" another element, it may be directly on the other element or intervening elements may also be present. In contrast, when an element is referred to as being "directly on" or "directly over" another element, there are no intervening elements present. It will also be understood that when an element is referred to as being "beneath," "below," or "under" another element, it may be directly beneath or under the other element, or intervening elements may be present. In contrast, when an element is referred to as being "directly beneath" or "directly under" another element, there are no intervening elements present.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Variation in soil water-holding capacity may cause uniform irrigation systems to over water particular regions of a field or an irrigation area in which the soil may exhibit lower water absorption rates due to a larger clay percentage while leaving under irrigated those regions in which the soil may have faster water absorption rates due to a higher sand composition. In certain geographic regions, such as deserts or arid areas, efficient use of water and fertilizers may be beneficial since an inappropriate response to sub-optimal irrigation may lead to crop loss due to the harsh environment conditions.

New technologies such as GPS, satellites, aerial remote sensing, and wireless sensors may help assess natural variations in the field more accurately so that water and/or fertilizer irrigation may be automatically adjusted and targeted based on the field conditions. This may optimize irrigation efficiency in order to avoid under or over irrigated regions of an irrigation field and in turn improve crop yield and reduce economic losses. Precision agriculture may include a variable rate or a targeted irrigation system which aim to maintain a constant moisture or fertilizer level in the soil by automatically adjusting the amount of water or fertilizer delivered based on a real time feedback from in-field or remote sensors and spatial temporal analytics of the irrigation needs (including weather data and forecast) together with local Geographic Information System (GIS) data.

Since the irrigation area covered by a particular irrigation system may be smaller than what may be observed from a satellite image system, GIS data alone is not sufficient to accurately determine the irrigation needs of the irrigation area. Thus, finer resolution data may be helpful to better assess the irrigation needs. The finer resolution data may be obtained by utilizing localized sensors and integrating a real time feedback system where sensor data may drive the irrigation. For example, the sensor data may be processed to provide direct control and automatic scheduling of the irrigation system, thus providing precise and targeted irrigation adapted to the crop needs. Creating real time irrigation maps and verifying that the right amount of water and fertilizer have been delivered may present a challenge to current farming practices mainly due to the additional constrain that the system may need to operate in a way such that constant soil moisture may be maintained or fertilizer run off may be minimized.

Therefore, by implementing an automatic irrigation control and scheduling system, using multiple data sources, embodiments of the present disclosure may, among other potential benefits, provide tailored water and fertilizer irrigation according to the needs of the irrigation area in order to reduce over or under irrigation and optimize water and fertilizer delivery.

The present invention generally relates to central pivot irrigation systems and more particularly to implementing targeted irrigation using the central pivot irrigation system with a wireless sensor network. One way to implement targeted irrigation using the central pivot irrigation system with a wireless sensor network may include obtaining or receiving data from a variety of sources including local wireless and optical sensors in order to determine vegetation index, soil moisture, and canopy leaf temperature, and automatically adjusting the irrigation delivery based on a real time estimation of these parameters. One embodiment by which to implement targeted irrigation using the central pivot irrigation system with a wireless sensor network is described in detail below by referring to the accompanying drawings in FIGS. 1-5.

Referring now to FIG. 1, a typical configuration for a central pivot irrigation system 100 (hereinafter "central pivot system") is depicted, according to an embodiment of the present disclosure. The central pivot system 100 may be deployed over a relatively large area such as a farm or field that may require a predefined amount of water or fertilizer to be delivered to a crop.

The central pivot system 100 may generally include a central tower or pivot point 12 located at the center of an irrigation area 14. The central tower 12 may include a pivot mechanism and a main control panel (not shown) generally anchored to a base connected to a fixed water supply source (not shown). A rotating arm 16 may be rotatably attached at one end to the central tower 12, and may rotate freely around the central tower 12. The rotating arm 16 may be held at an elevated position above the ground by a plurality of wheeled framed towers 18 (hereinafter "framed towers"). The rotating arm 16 may include a plurality of segments joined together extending outwardly from the central tower 12. Each segment, as illustrated in the section view, section A, may include a section of pipe and one of the framed towers 18. Each segment may include one or more nozzles 28 positioned at predetermined points along the section of pipe. The nozzles 28 may be used for dispensing a fluid such as water and/or fertilizer, in a generally circular spray pattern simultaneously as the rotating arm 16 pivots around the central tower 12. Water or fertilizer may be provided to each nozzle 28 via the pipe sections joined together from segment to segment. Further, each individual nozzle 28 may be fitted with a valve 30 which may control how much water is dispensed through each individual nozzle 28. An automatic alignment system may keep the rotating arm 16 relatively straight during irrigation and rotation around the central tower 12.

In an embodiment of the present disclosure, the central pivot system 100 may typically rotate at a constant speed of approximately 1 rotation per day to approximately 3 rotations per day around the central tower 12 covering the irrigation area 14 in a circular pattern as depicted in FIG. 1. Alternatively, in an embodiment, the rotation speed of the rotating arm 16 may be variable, including start and stop motion, within the typical limits of the mechanical controls. The rotating arm 16 may include any number of segments from one to as many as 100. The number of segments may be set by the granularity of the detection of irrigation/fertilization needs. The length of the rotating arm 16 may be adjusted according to the system design by adding or removing segments. Each segment of the rotating arm 16 may have a length ranging from approximately 1 ft. to approximately 100 ft. The framed towers 18 may keep the rotating arm 16 at a minimum height of approximately 2 ft. to approximately 8 ft. above the ground and may be located at a distance of approximately 50 ft. to approximately 1000 ft. from one another to maintain an even distribution of weight and loads between each of the framed towers 18. Each segment of the rotating arm 16 may include any number of nozzles 28 where multiple nozzles 28 may be spaced apart from each other based on their effective spray coverage. The nozzles 28 may preferably be spaced close enough such that their effective spray patterns overlap. It should be noted that the above parameters may be optimized to achieve any desired irrigation result.

Figure 2:
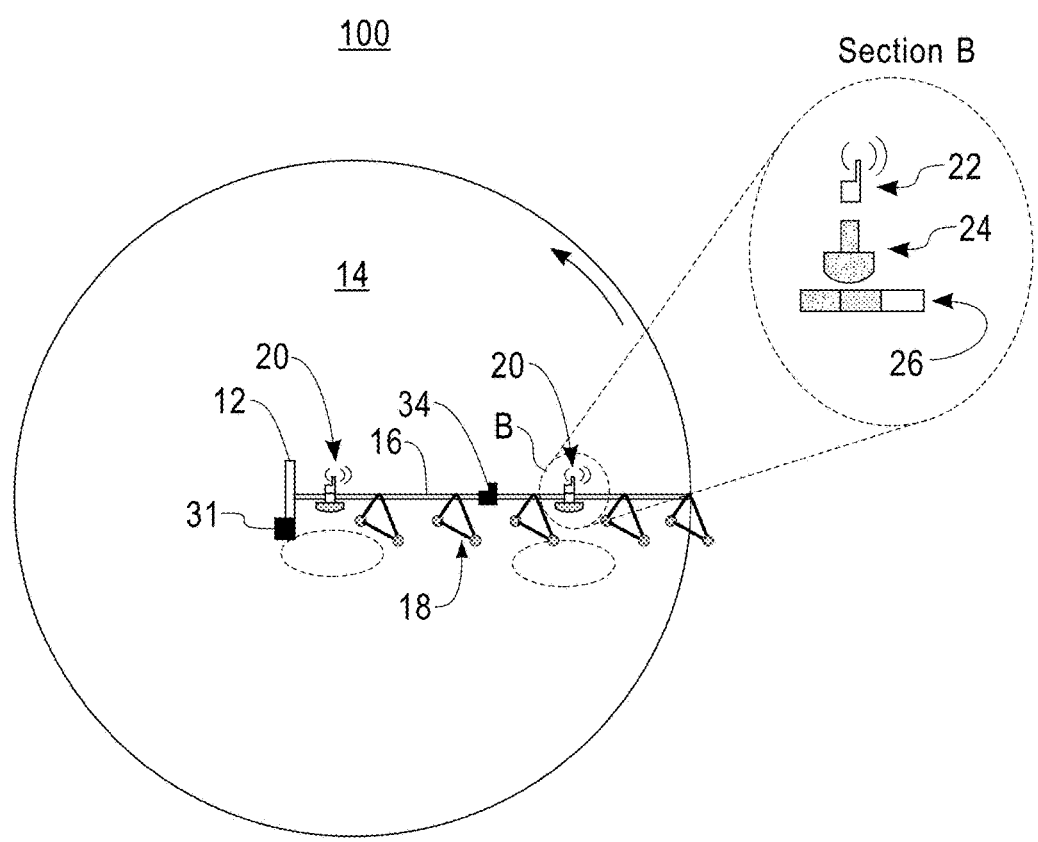
FIG. 2 is a schematic view of the central pivot irrigation system including a plurality of optical sensors on a rotating arm, according to an embodiment of the present disclosure.

Referring now to FIG. 2, a plurality of optical sensors 20 (hereinafter "optical sensors") may be installed along the rotating arm 16, according to an embodiment of the present disclosure. The optical sensors 20 may estimate crop and soil properties such as, for example, canopy reflectance, nitrogen distribution, soil temperature, and canopy temperature. The optical sensors 20 may include a down facing battery powered camera system including a wireless mote 22, a fisheye lens 24 and an integrated set of automatically adjustable filters 26 located in front of the fisheye lens 24 as depicted in section B.

The optical sensors 20 move with the rotating arm 16 while photographing and sensing the vegetation underneath. In an exemplary embodiment, the automatically adjustable set of filters 26 of the optical sensors 20 may consist of two or more narrow band filters that may rapidly move in front of the fisheye lens 24. The automatically adjustable set of filters 26 may allow light of a specific bandwidth to pass through the fisheye lens 24 to obtain a spectrally distributed image of the canopy or crop. For example, a green filter may be used to measure canopy reflectance, a red filter may be used to measure nitrogen distribution, and an infrared filter may be used to measure soil and canopy temperatures. Sequential imaging of the same area under different wavelength may provide information about water needs (normalized differential vegetation index from red and infrared bandwidths) and fertilizer needs (organic components in the soil from green and infrared bandwidths). The images from the optical sensors 20 may be processed locally on a microprocessor and the irrigation needs may be transmitted via the wireless mote 22 back to a central computer 31 located at the base of the central tower 12.

Alternatively, the raw image data from the optical sensor 20 may be wirelessly transmitted to and then processed by the central computer 31 to determine the irrigation needs. Each image may be time stamped and georeferenced using, for example, a global positioning system (GPS), such that each feature of the acquired images may have associated coordinates, for example, longitude and latitude. All images received by the central computer 31 may be stitched together in a larger map. If multiple sequences of the images are obtained for the same area, the first time reference image may be associated as a ground truth and adjustments may be made based on that image. Subsequent images may contain changes already induced by the irrigation system, such as change in canopy temperature due to water delivery. Both the location of the rotating arm 16 in time and time stamp of the image may be used to determine if irrigation has been carried out or not.

The optical sensors 20 may allow imaging of substantially large areas of the field to determine vegetation and soil properties; however limited by distance above the ground and angle of the fisheye lens. Alternatively, the optical sensor 20 may further include infrared temperature sensors to measure the temperature of the crop canopy. Additionally, information from individual plants or crop patches may be localized in space and time, and a sequence of data may be archived by the central computer 31 to correlate a position of the rotating arm 16 with the detected soil moisture and canopy temperature data.

In some embodiments, in addition to the optical sensors 20, a plurality of microwave devices 34 may be installed along the rotating arm 16 to measure complementary soil moisture data. The microwave devices 34 may include a microwave polarimetry generator (VV, HH, VH, and HV) coupled to a sensor that may function at different frequencies and polarization levels. The microwave devices 34 may detect wet/dry soil response. In such embodiments, frequency modulation may allow a variable depth of penetration of the soil. The system may perform real time assessment of the reflection of a large area of the field to determine water content and the spatial distribution of soil moisture. In all cases the optical sensors 20 and the microwave devices 34 may preferably be positioned in front of each segment such that soil data may be collected immediately prior to irrigating a particular area. For example, the optical sensors 20 may be mounted to an arm extending outwardly from each segment in the direction of rotation of the rotating arm 16. Each segment of the rotating arm 16 may include one or more optical sensors 20 and one or more microwave devices 34 to generate the desired characteristic data.

In an alternatively embodiment, either the in-ground 32, the microwave devices 34, or both may be hard wired to the central computer 31 allowing them to communicate via a communication cable rather than a wireless signal. This may be desired in situations when the distance between the in-ground 32, microwave devices 34 and the central computer 31 may be substantially large and there may be a chance to lose the wireless signal.

Figure 3:
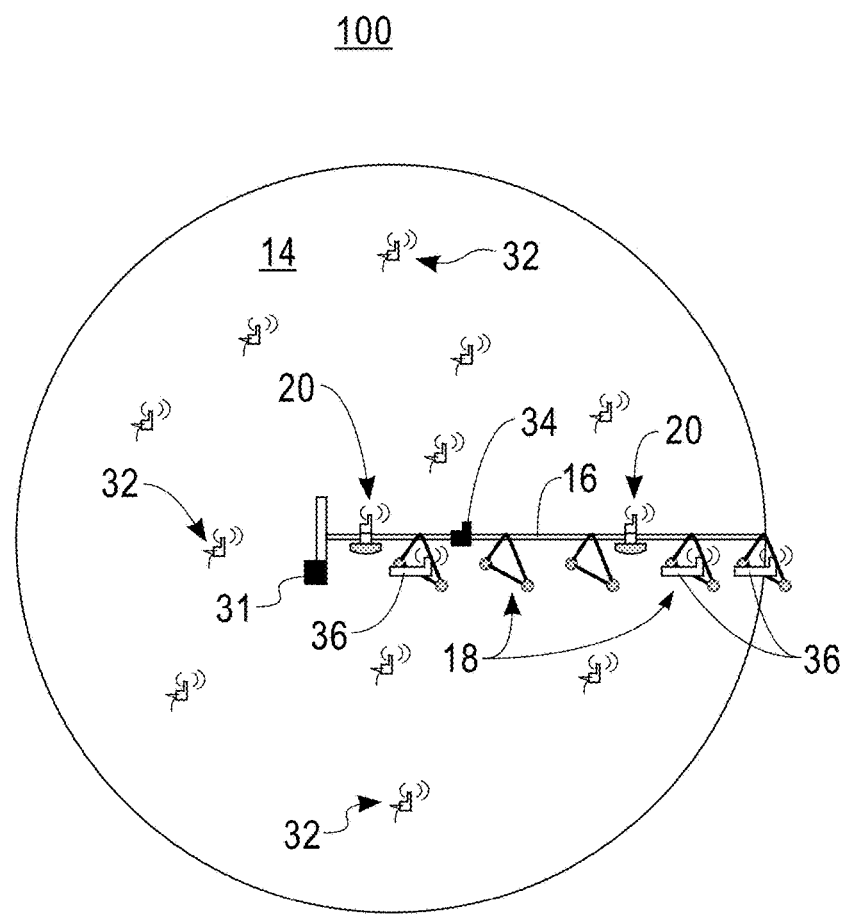
FIG. 3 is a schematic view of the central pivot irrigation system including a plurality of in-ground sensors and a plurality of gateway devices on the rotating arm, according to an embodiment of the present disclosure.

Referring now to FIG. 3, a plurality of in-ground sensors 32 may be positioned across the irrigation area 14 to provide a variety of data related to the physical characteristics of the soil. In one embodiment, the in-ground sensors 32 may detect, for example, soil moisture and soil temperature. In another embodiment, the in-ground sensors 32 may include functionalized electrodes to measure ionic potential variations caused by fertilizers in the soil. The in-ground sensors 32 may be buried underground or may be positioned above ground in a way such that they do not interfere with the central pivot system 100. The in-ground sensors 32 may continuously monitor the physical characteristics of the soil. The in-ground sensors 32 may be connected to various microcontrollers and radio devices that may transmit data to a plurality of gateway devices 36 (hereinafter "gateway devices") described below.

It should be noted that each of the above sensors (the optical sensors 20, the microwave devices 34, and the in-ground sensors 32) may further include a GPS receiver from which the precise location of each sensor may be determined. As such, sensor data subsequently received by the central computer 31 will include location data of the corresponding sensor, and as such, location data corresponding to the physical characteristics of the irrigation area 14.

The central pivot system 100 may further include one or more gateway devices 36 that communicate with any or all of the wireless sensors, for example the in-ground sensors 32, the optical sensors 20, or the microwave devices 34, of the central pivot system 100. More specifically, the gateway devices 36 may be mounted on the framed towers 18 as depicted in FIG. 3. The gateway devices 36 may collect or receive data wirelessly from any or all of the wireless sensors, and subsequently transmit that data to the central computer for further analysis. Communication between the gateway devices 36 and the wireless sensors may be conducted on any known wireless protocol, such as, for example, any of the wireless protocols described below.

In one embodiment, the wireless sensors may be programmed to transmit data at fixed time intervals. In another embodiment, the wireless sensors, and more specifically the in-ground sensors 32, may be synchronized to transmit information only when the gateway devices 36 are in close proximity, due to the fact that the gateway devices 36 move with the rotating arm 16 relative to the in-ground sensors 32 which have fixed locations in the ground. The gateway devices 36 may process, in real time, the acquired data from the in-ground sensors 32 and transmit it to the central computer 31 to adjust the irrigation schedule, speed of the rotating arm 16 or request additional information from other sensors.

Figure 4:
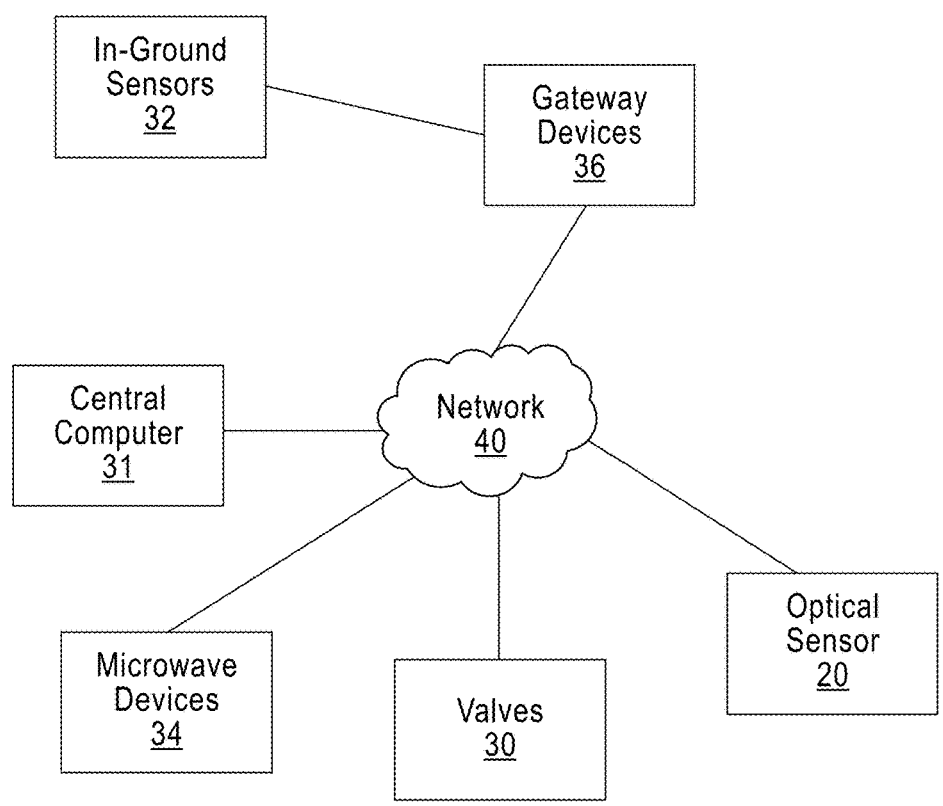
FIG. 4 is a functional block diagram of a hybrid wired and wireless computing environment, according to an embodiment of the present disclosure.

Referring now to FIG. 4, a functional block diagram of a hybrid wired and wireless computing environment 200 is shown, according to an embodiment of the present disclosure. The computing environment 200 includes the central computer 31, the microwave devices 34, the valves 30, the optical sensors 20, the gateways devices 36, and the in-ground sensors 32, all interconnected over a network 40.

In a preferred embodiment of the present invention, the central computer 31, the microwave devices 34, the valves 30, the optical sensors 20, and the gateway devices 36 are all Ethernet and wireless enabled; however the in-ground sensors 32 are only wireless enabled. In particular, the wireless enabled components of the network 40 all support the following protocols: the IEEE Std 802.3-2008 Part 3: Carrier Sense Multiple Access with Collision Detection (CSMA/CD) Access Method and Physical Layer Specifications ("Ethernet"); the IEEE Std 802-11n-2009 Part 11: Wireless LAN Medium Access Control (MAC) and Physical Layer (PHY) Specifications; and the IEEE Std 802.15.4a-2007 Part 15.4: Wireless Medium Access Control (MAC) and Physical Layer (PHY) Specifications for Low-rate Wireless Personal Area Networks (WPANs) ("802.15"). IEEE and 802 are registered trademarks of the Institute of Electrical and Electronics Engineers, Incorporated.

The IEEE Std 802.11n-2009 wireless protocol, commonly referred to as 802.11n, is a later version of the IEEE Std 802.11-1999 wireless protocol. Computing devices using the 802.11n wireless protocol typically have a wireless range of as much as 70 meters, although actual ranges in a working environment can be substantially less. Other versions of the 802.11-1999 standard, such as the commonly used 802.11b-1999 and 802.11g-2003 wireless protocols, have a range of about half that of the 802.11n wireless protocol. Although in the preferred embodiment, computing devices may support the 802.11n wireless protocol, those skilled in the art will recognize that embodiments of the invention can be practiced using the IEEE Std 802.11-1999 wireless protocol, and any later versions of this protocol including 802.11b, and 802.11g. The 802.11n wireless protocol, and other versions of the IEEE Std 802.11-1999 wireless protocol, are collectively referred to herein as the 802.11 wireless protocol.

The IEEE Std 802.15.4a-2007 is a later version of the Bluetooth-based IEEE Std 802.15.1-2002 wireless protocol. Computing devices using the 802.15.4a wireless protocol typically have a wireless range of about 10 meters, although certain implementations, such as the ultra-wide band physical layer (UWB PHY) have a precision ranging capability of about one meter. Although in the preferred embodiment, computing devices 110 support the 802.15.4a wireless protocol, those skilled in the art will recognize that embodiments of the invention can be practiced using the IEEE Std 802.15.1-2002 wireless protocol, and any later versions of this protocol. The 802.15.4a wireless protocol, and other versions of the IEEE Std IEEE Std 802.15.1-2002 wireless protocol, are collectively referred to herein as the 802.15 wireless protocol.

In a preferred embodiment, network 40 represents a hybrid wired/wireless network that includes a wired Ethernet network, and a wireless protocol network operating in infrastructure mode. The network 40 may include both Ethernet and 802.11 wireless protocol routers (not shown) having fixed physical locations. With regards to the Ethernet routers, each port that is used to connect to a wireless enabled device, such as in-ground sensors 32, can be associated with a physical location. For example, although an Ethernet router may be located an equipment closet, a port on the router may be connected through system wiring to a specific device on the network. The router port may be associated to the network component by, for example, a database of such associations. Thus, from a network perspective, a network component that is identified as being connected to the router port can be mapped to a physical location by performing a router port to physical location lookup in the database. In the present example, a physical location of a particular network component may include a segment number indicating which segment of the rotating arm 16 the particular network component is located. If multiple network components are located in a single segment, the physical location may include a network component number in addition to a segment number.

The 802.11 wireless protocol routers are located in fixed physical locations. For example, wireless routers might be placed in a centralized location, for example the central tower 12, to provide optimal coverage for wireless enabled network components in the system.

In the preferred embodiment, the central computer supports the infrastructure and ad hoc modes of the 802.11 wireless protocol. The most common manner to use an 802.11 wireless protocol network is in "infrastructure" mode. In this mode, wireless network components communicate with a wireless access point, for example, an 802.11 wireless protocol router. Typically, the wireless router serves as a bridge to a wired local area network (LAN) or wide area network (WAN). In such a network, wireless devices do not communicate directly with each other, but rather via the wireless access point and usually over a LAN or WAN. All wireless devices that are connected to a network via a specific wireless access point are configured to use the same service set identifier (SSID), which serves as an identifier for all devices connected to a specific wireless access point. In 802.11 wireless protocol infrastructure mode, the SSID for a wireless access point typically is the access point's media access control (MAC) address. A MAC address is a unique 48-bit number assigned to the network interface card (NIC) of each wireless device by its manufacturer.

In 802.11 wireless protocol ad hoc mode, a temporary wireless network is established between computers and devices. In an ad hoc wireless network, computers and network components connect directly to each other rather than to a wireless access point. To set up an ad hoc wireless network, each wireless adapter must be configured for ad hoc mode rather than infrastructure mode. In addition, all wireless adapters in the ad hoc wireless network must use the same SSID and the same channel number. Each wireless network component can only be a transmitter (TX) or a receiver (RX) at any given time. Communication among wireless network components is limited to a certain transmission range or distance, and wireless network components in the ad hoc wireless network share the same frequency domain to communicate. Within such a range, only one transmission channel is used, covering the entire bandwidth.

In the preferred embodiment, the central computer also support the 802.15 wireless protocol. Similar to the 802.11 wireless protocol in ad hoc mode, 802.15 wireless protocol can establish wireless connections directly between enabled network components. An 802.15 wireless protocol network established between two or more enabled network components is referred to as a wireless personal area network (WPAN). The 802.15 wireless protocol is a packet-based protocol with a master-slave structure. One master may communicate with up to seven slaves in a "piconet" network, and the slaves in the piconet can only communicate with the master. An 802.15 wireless protocol network is typically established when one 802.15 wireless protocol enabled network component in discoverable mode (the slave device) responds to an inquiry from another enabled network component seeking other devices (the master device) to connect to. The network component in discoverable mode responds to the inquiry with identifying information that can include its MAC address.

In general, the network 40 and the wireless network components connected to it can support any combination of communication protocols where at least one of the protocols, is a wireless protocol that supports either direct peer-to-peer communications or a larger wireless range than the other. In addition, one or more of the central computer in the network 40 may be associated with a fixed physical location.

With continued reference to FIG. 4, the optical sensors 20, the microwave devices 34, and the in-ground sensors 32 may together make up a sensor network. Data from each sensor in the sensor network may be integrated in real time analytics with additional external data sets (weather, solar radiation, crop models etc.) on the central computer 31. The input from the sensor network may be integrated into decision models to determine optimum time or decide if irrigation may be delayed. The irrigation needs may then be determined based on the analysis and individual valves 30 corresponding with individual nozzles 28 may be opened to allow irrigation to begin at designated locations along the rotating arm 16 corresponding with target area(s) of the irrigation area 14 where the system has indicated a water deficiency. Stated differently, after data is collected and processed, the central computer may issue commands to the valves 30 to adjust water flow of individual nozzles 28 according to targeted irrigation needs. Alternatively, the nozzles 28 may operate in a pulsed mode which may be beneficial in cases where a reduced amount of water may need to be delivered. In the pulsed mode, the amount of water required may be distributed within the time the rotating arm 16 pivots around the central tower 12 such that the water may get into the soil rather than running off. In some embodiments, it may be beneficial to determine the ability of the soil to absorb the water at certain rates. The irrigation needs mentioned above may be determined by combining data collected and processed from the microwave devices 34, the optical sensors 20 and the in-ground sensors 32.

Figure 5:
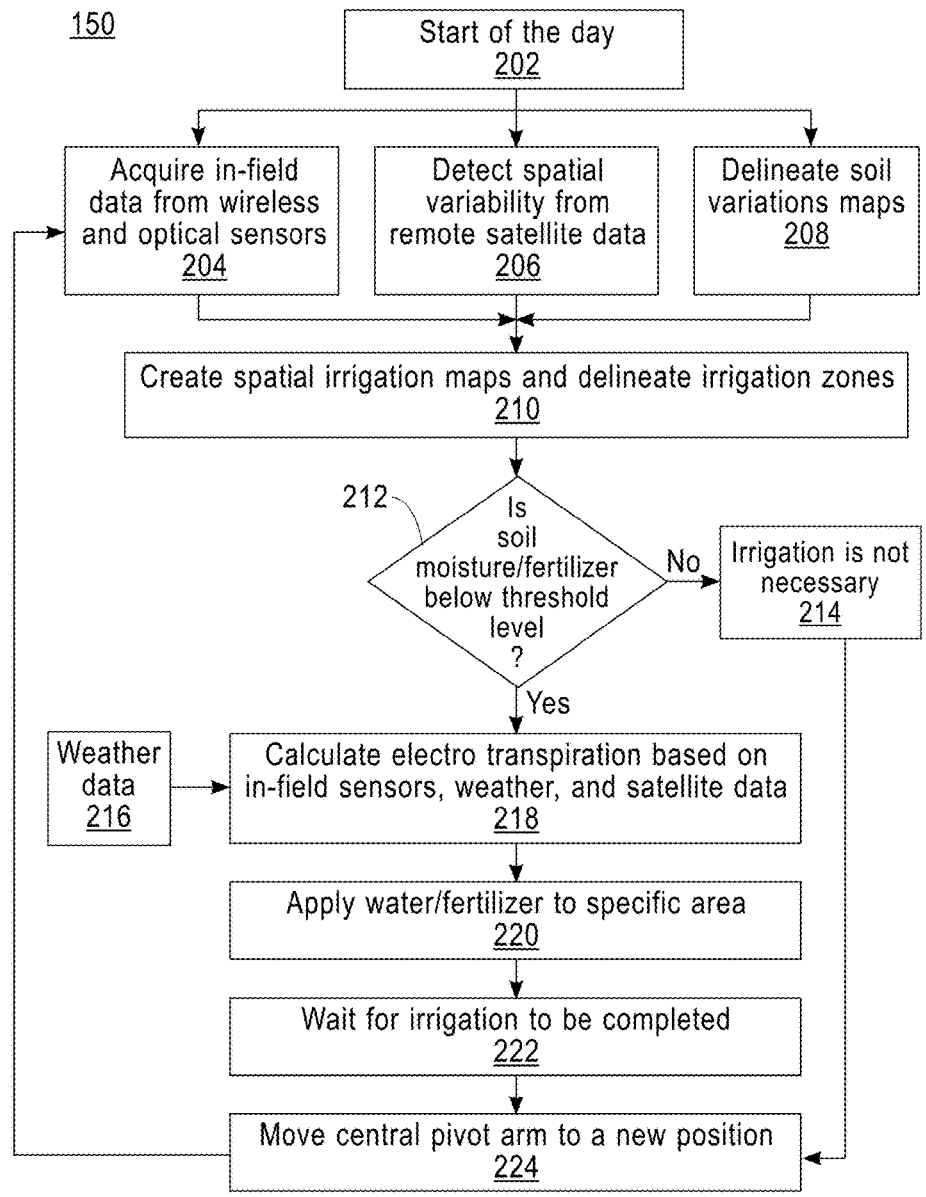
FIG. 5 is a flow chart depicting a sequence of steps for targeted irrigation using the central pivot irrigation system and the wireless sensor network, according to an embodiment of the present disclosure.

Referring now to FIG. 5, a flow chart 150 depicting a sequence of steps to implement targeted irrigation using the central pivot irrigation system 100 with a wireless sensor network, is shown, according to an embodiment of the present disclosure. An initial step 202 may indicate the start of the central pivot system 100 (FIG. 3) rotation around the irrigation area 14 (FIG. 3). Next, data may be collected from a variety of sources. At this step, the strength of the signal may be checked and the ID of all sensors within the target area combined with data and timestamp of data acquisition may be retrieved. In-field data may be acquired in step 204 from optical sensors 20 (FIG. 3) and in-ground sensors 32 (FIG. 3) to determine, for example, moisture level in the soil. In embodiments in which microwave devices 34 have been installed, soil data from these devices may also be obtained at this point of the data acquisition process. The areas of the field that may require more water or larger amounts of fertilizer (also referred to as spatial variability) may be detected in step 206 from remote satellite data, spatial changes in soil water holding capacity may also be identified while current soil variation maps may be delineated in step 208. Data from external sources (weather data, satellite data, solar radiation data, and crop models) may be acquired by the central computer 31 and send back to individual computational nodes to estimate irrigation needs. The estimated information is retransmitted to the central computer 31.

Figure 5A:
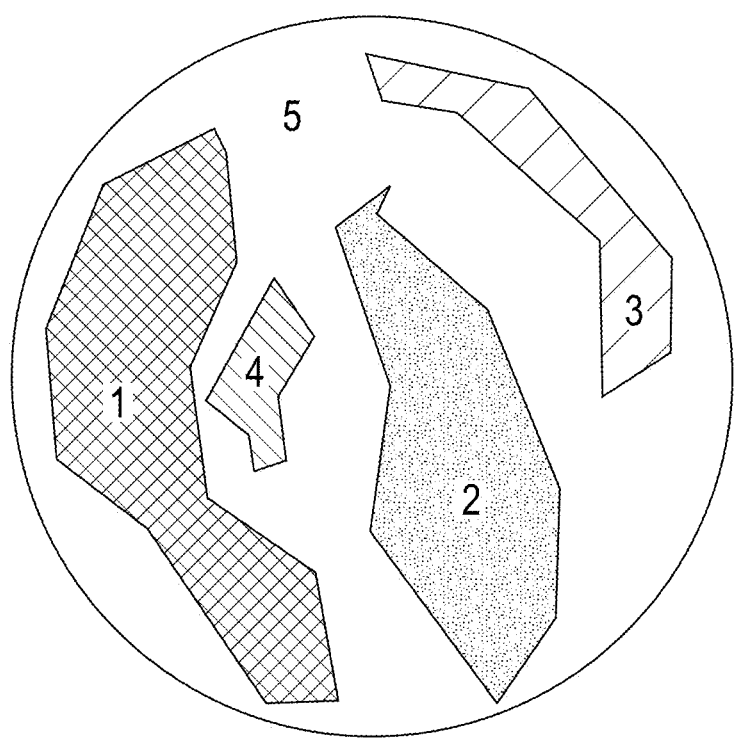
FIG. 5A is an initial irrigation map created following the sequence of steps in FIG. 5.
Figure 5B:
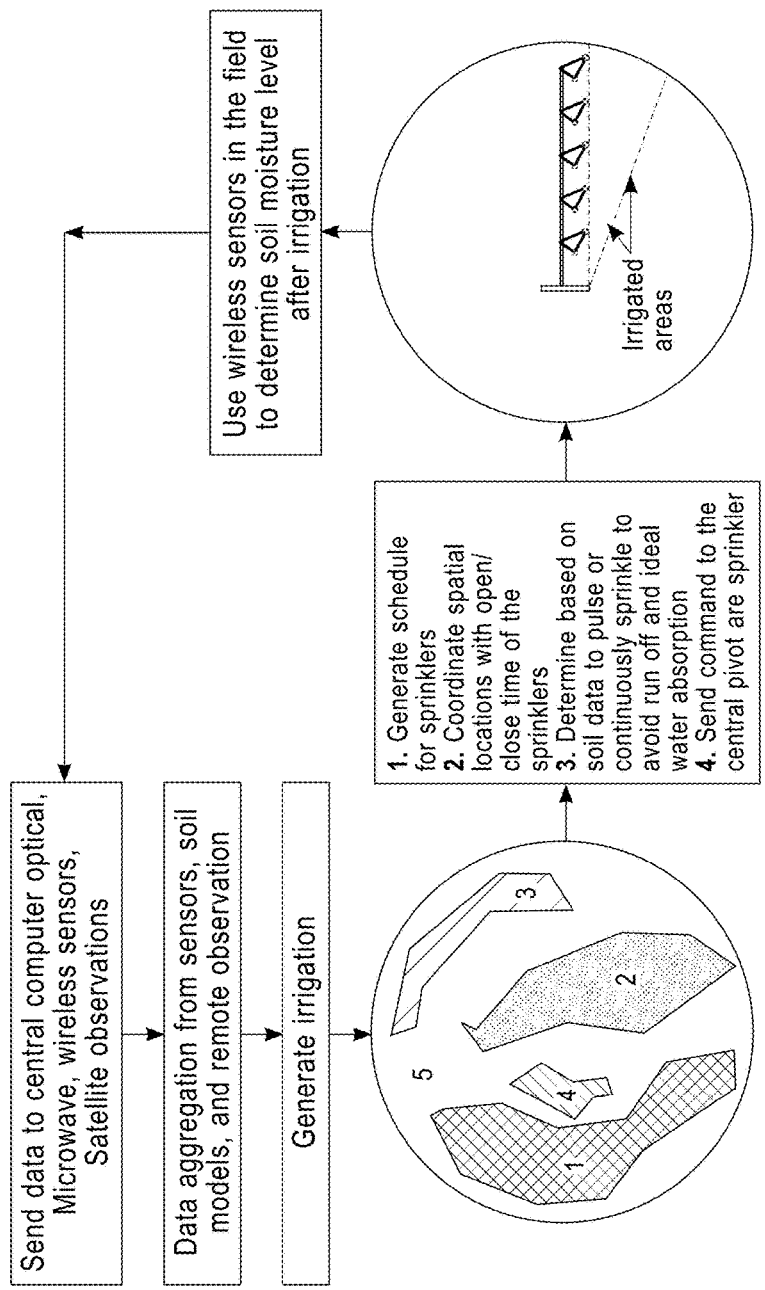
FIG. 5B is a functional diagram depicting generating an irrigation schedule based on the initial irrigation map of FIG. 5A.

An initial spatial irrigation map (FIG. 5A) of the field with delineated irrigation zones (1, 2, 3, 4 and 5) may be created in step 210 after integrating the data obtained from steps 204, 206, and 208 in the central computer 31 located in the central tower 12 (FIG. 3). The initial spatial irrigation map (FIG. 5A) may provide real time details about current soil moisture and crop conditions from which an irrigation schedule may be established in the central pivot system 100 (FIG. 3) as described in FIG. 5B. If the initial estimation of soil moisture (or fertilizer) level is above a predetermined threshold, then the water emitter devices located in the rotating arm 16 (FIG. 3) may not be activated and irrigation is not performed (step 214). Conversely, if the estimated soil moisture (or fertilizer) level is below the predetermined threshold, electro transpiration may be calculated in step 218 based on in-field sensors data, weather data (step 216), and satellite data. An irrigation schedule is then generated in the central computer 31 including the amount of water required for irrigation, then a command may be sent to one or more segments of the rotating arm 16 (FIG. 3) containing the nozzles 28 in order to deliver water or fertilizer to areas in which deficiencies were detected (step 220). Once irrigation has been completed (step 222) the rotating arm 16 (FIG. 3) may be moved to a new position (step 224) and the process starts again. If received information detects that the weather may change and a rain event may be likely to occur, the central computer 31 may integrate the weather information in real time and adjust the irrigation schedule accordingly. If the rainfall was below the predicted level, the difference may be added to the next day irrigation schedule. In case of a larger amount of rain fall, the next day irrigation may be delayed until data from the infield sensors indicates that the soil moisture level may be below a threshold or plants are stressed.

It should be noted that the spatial irrigation maps generated based on data from the in-ground sensors 32 and the optical sensors 20 may provide dynamic real time representations of crop conditions. Then, customized and targeted irrigation may be provided base on real time modeling of soil properties. These dynamic real time representations of crop conditions, may also allow automatically adjusting the functioning of the nozzles 28 according to current water or fertilizer needs. Additionally, in some embodiments, the movement of the rotating arm 16 may be correlated with the data obtained from the in-ground and optical sensors 32, 20 in order to reduce water waste and minimize water run-off. If the amount of water to be delivered to an area is larger than expected, the rotation speed of the rotating arm 16 may be changed to deliver the water under the flow constrain. The velocity of the rotating arm 16 may be directly related to the water needs. In other embodiments, the movement of the rotating arm 16 may be relatively constant, and the targeted irrigation may be carried out by turning individual nozzles 28 on and off as needed based on the irrigation map generated by the central computer 31.

Therefore, by forming a wireless sensor network across an irrigation area maintained by a central pivot irrigation system, real time information about soil and vegetation conditions may be acquired and combined with data originated from remote observation of the field in order to precisely determine the required amount of water or fertilizer.

The amount of water or fertilizer required in each irrigation zone within the central pivot system 100 may be assessed through in-field sensing or remote optical monitoring of the crop by detecting the vegetation and leaf area index of each irrigation zone. Through real time analytics, irrigation maps may be created showing zones within the central pivot system that may require to be irrigated. Once the spatial extent and amount of water required for irrigation is determined, commands may be issued to segments of the irrigation arms such that a differential irrigation pattern is set for the central pivot system 100. In an embodiment, each irrigation segment may be independently controlled, such that one segment is irrigating while another segment is not irrigating. The length of the segments may be adjusted according to the local conditions and the spatial variability of the soil, thus improving water and fertilizer delivery, compared to uniform irrigation systems. In other embodiments, as discussed above, more precision may be obtained by controlling the flow of individual nozzles. The embodiments presented above efficiently maintain constant soil moisture at the desired depths, and allow for confirmation that any desired irrigation levels have been achieve using the same real time monitoring system. For example, the central computer 31 may process the information from the in-ground sensors 32 about excessive watering, verify this information with other sensors in the sensor network to make the decision of shutting down the valves that may be delivering excessive amounts of water.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

acquiring, by a computer, data from a wireless sensor network comprising a plurality of optical sensors, a plurality of in-ground sensors and a gateway device, the data corresponding to an irrigation area of a field, wherein the plurality of optical sensors are located along one or more of a plurality of pipe segments joined together end to end and supported above the ground on wheeled framed towers, the plurality of optical sensors comprising a down facing camera system comprising a wireless mote, a fisheye lens, and an integrated set of automatically adjustable filters located in front of the fisheye lens, the automatically adjustable set of filters comprising two or more narrow band filters that allow light on a specific bandwidth to pass through the fisheye lens to obtain spectrally distributed images of a crop, wherein each filter in the automatically adjustable set of filters is associated with a soil property or a vegetation property, the plurality of optical sensors continuously capture and transmit soil data and vegetation data to the computer via the wireless mote, wherein the plurality of in-ground sensors are at least partially embedded into the soil within the irrigation area, the plurality of in-ground sensors detect soil properties, wherein the gateway device is attached to one or more of the wheeled framed towers and wirelessly transmits the detected soil properties from the plurality of in-ground sensors to the computer; and integrating, by the computer using real time analytics, soil and vegetation properties from the plurality of optical sensors, soil moisture properties from the plurality of in-ground sensors, soil properties from the plurality of microwave devices and external data to determine current soil moisture and crop conditions.

2. The method of claim 1, wherein each spectrally distributed image captured by the plurality of optical sensors is time stamped and georeferenced by means of a global positioning system such that each feature of the acquired spectrally distributed images has associated coordinates.

3. The method of claim 1, wherein the computer correlates soil data and vegetation data with a position of the plurality of pipe segments.

4. The method of claim 1, further comprising:
based on current soil moisture and crop conditions, creating an irrigation map of the field comprising delineated irrigation zones;
in response to the current soil moisture and crop conditions being below a predetermined threshold, generating, by the computer, an irrigation schedule; and
communicating the irrigation schedule to flow control valves to open or close such that water and fertilizer are delivered only to zones identified on the irrigation map.

5. The method of claim 4, further comprising:
based on a rainfall being below a predicted rainfall level in the weather data acquired by the computer, adjusting the irrigation schedule such that the difference is added to the irrigation schedule for the next day; and
based on the rainfall being above a predicted rainfall level in the weather data acquired by the computer, adjusting the irrigation schedule such that irrigation is delayed until data from the plurality of optical sensors and the plurality of in-ground sensors indicates soil moisture and crop conditions are below the predetermined threshold.

6. The method of claim 1, wherein the soil and vegetation properties detected by the plurality of optical sensors comprises:
canopy reflectance, vegetation index, nitrogen distribution, soil temperature and canopy temperature.

7. The method of claim 1, wherein the soil properties detected by the plurality of in-ground sensors comprises:
soil moisture, soil temperature, and ionic potential variations caused by fertilizers in the soil.

8. The method of claim 1, wherein the plurality of in-ground sensors are connected to various microcontrollers and radio devices to transmit acquired data to a plurality of gateway devices, the plurality of gateway devices process data from the in-ground sensors in real time and transmit processed data to the computer to adjust the irrigation schedule, a speed of a rotating arm or request additional information from additional sensors.

9. The method of claim 1, further comprising:
a plurality of microwave devices located along one or more of the pipe segments, the microwave devices detecting soil moisture properties to complement soil properties from the plurality of in-ground sensors, wherein the plurality of microwave devices comprises a microwave polarimetry generator (VV, HH, VH, and HV) coupled to a sensor that functions at different frequencies and polarization levels.

10. The method of claim 1, wherein each pipe segment comprises one or more nozzles for dispensing a fluid on an irrigation area below the pipe segments.

11. The method of claim 1, wherein the external data comprises weather data, satellite data, solar radiation data, and crop models.

12. A computer program product comprising:
a computer readable non-transitory article of manufacture tangibly embodying computer readable instructions which, when executed, cause a computer to carry out a method comprising:
acquiring, by a computer, data from a wireless sensor network comprising a plurality of optical sensors, a plurality of in-ground sensors and a gateway device, the data corresponding to an irrigation area of a field,
wherein the plurality of optical sensors are located along one or more of a plurality of pipe segments joined together end to end and supported above the ground on wheeled framed towers, the plurality of optical sensors comprising a down facing camera system comprising a wireless mote, a fisheye lens, and an integrated set of automatically adjustable filters located in front of the fisheye lens, the automatically adjustable set of filters comprising two or more narrow band filters that allow light on a specific bandwidth to pass through the fisheye lens to obtain spectrally distributed images of a crop, wherein each filter in the automatically adjustable set of filters is associated with a soil property or a vegetation property, the plurality of optical sensors continuously capture and transmit soil data and vegetation data to the computer via the wireless mote,
wherein the plurality of in-ground sensors are at least partially embedded into the soil within the irrigation area, the plurality of in-ground sensors detect soil properties,
wherein the gateway device is attached to one or more of the wheeled framed towers and wirelessly transmits the detected soil properties from the plurality of in-ground sensors to the computer; and
integrating, by the computer using real time analytics, soil and vegetation properties from the plurality of optical sensors, soil moisture properties from the plurality of in-ground sensors, soil properties from the plurality of microwave devices and external data to determine current soil moisture and crop conditions.

13. The computer program product of claim 12, wherein each spectrally distributed image captured by the plurality of optical sensors is time stamped and georeferenced by means of a global positioning system such that each feature of the acquired spectrally distributed images has associated coordinates.

14. The computer program product of claim 12, wherein the computer correlates soil data and vegetation data with a position of the plurality of pipe segments.

15. The computer program product of claim 12, further comprising:
based on current soil moisture and crop conditions, creating an irrigation map of the field comprising delineated irrigation zones;
in response to the current soil moisture and crop conditions being below a predetermined threshold, generating, by the computer, an irrigation schedule; and
communicating the irrigation schedule to flow control valves to open or close such that water and fertilizer are delivered only to zones identified on the irrigation map.

16. The computer program product of claim 15, further comprising:
based on a rainfall being below a predicted rainfall level in the weather data acquired by the computer, adjusting the irrigation schedule such that the difference is added to the irrigation schedule for the next day; and
based on the rainfall being above a predicted rainfall level in the weather data acquired by the computer, adjusting the irrigation schedule such that irrigation is delayed until data from the plurality of optical sensors and the plurality of in-ground sensors indicates soil moisture and crop conditions are below the predetermined threshold.

17. The computer program product of claim 12, wherein the soil and vegetation properties detected by the plurality of optical sensors comprises:
canopy reflectance, vegetation index, nitrogen distribution, soil temperature and canopy temperature.

18. The computer program product of claim 12, wherein the soil properties detected by the plurality of in-ground sensors comprises:
soil moisture, soil temperature, and ionic potential variations caused by fertilizers in the soil.

19. The computer program product of claim 12, wherein the plurality of in-ground sensors are connected to various microcontrollers and radio devices to transmit acquired data to a plurality of gateway devices, the plurality of gateway devices process data from the in-ground sensors in real time and transmit processed data to the computer to adjust the irrigation schedule, a speed of a rotating arm or request additional information from additional sensors.

20. The computer program product of claim 12, further comprising:
a plurality of microwave devices located along one or more of the pipe segments, the microwave devices detecting soil moisture properties to complement soil properties from the plurality of in-ground sensors, wherein the plurality of microwave devices comprises a microwave polarimetry generator (VV, HH, VH, and HV) coupled to a sensor that functions at different frequencies and polarization levels.

* * * * *